United States Patent
Renn et al.

(10) Patent No.: US 10,532,625 B2
(45) Date of Patent: Jan. 14, 2020

(54) ADJUSTABLE SPRING SUPPORT

(71) Applicant: ZF FRIEDRICHSHAFEN AG, Friedrichshafen (DE)

(72) Inventors: Josef Renn, Dettelbach (DE); Alexander Schwarz, Thuengen (DE); Hendrik Marquar, Schweinfurt (DE); Tom Schneider, Burkardroth (DE); Jan Rossberg, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 130 days.

(21) Appl. No.: 15/570,774

(22) PCT Filed: Apr. 12, 2016

(86) PCT No.: PCT/EP2016/057996
§ 371 (c)(1),
(2) Date: Oct. 31, 2017

(87) PCT Pub. No.: WO2016/180590
PCT Pub. Date: Nov. 17, 2016

(65) Prior Publication Data
US 2018/0147909 A1    May 31, 2018

(30) Foreign Application Priority Data

May 12, 2015   (DE) .......................... 10 2015 208 785

(51) Int. Cl.
*B60G 17/027*  (2006.01)
*F16F 1/12*  (2006.01)
*B60G 11/16*  (2006.01)

(52) U.S. Cl.
CPC .......... *B60G 17/0272* (2013.01); *B60G 11/16* (2013.01); *F16F 1/121* (2013.01);
(Continued)

(58) Field of Classification Search
CPC .............. B60G 15/063; B60G 17/0272; B60G 17/0416; B60G 17/0152; B60G 2200/142;
(Continued)

(56) References Cited

U.S. PATENT DOCUMENTS

2002/0030311 A1   3/2002  Beck
2002/0171187 A1*  11/2002  Becker ............... B60G 17/0272
                                                    267/218
(Continued)

FOREIGN PATENT DOCUMENTS

DE       3223195      12/1983
DE      19744757       4/1999
(Continued)

*Primary Examiner* — Robert A. Siconolfi
*Assistant Examiner* — San M Aung
(74) *Attorney, Agent, or Firm* — Cozen O'Connor

(57) ABSTRACT

Adjustable spring support includes a first spring plate and a second spring plate, wherein at least one of the spring plates is axially adjustable relative to the other spring plate by an actuator, wherein the actuator is supplied with pressure medium via a pump which is driven by a motor and which is connected to a supply receptacle, wherein the motor, the pump and the supply receptacle form a constructional unit, and the constructional unit provides a cylindrical surface of the actuator.

8 Claims, 10 Drawing Sheets

(52) U.S. Cl.
CPC .... *B60G 2202/12* (2013.01); *B60G 2202/413* (2013.01); *B60G 2202/416* (2013.01); *B60G 2204/124* (2013.01); *B60G 2500/20* (2013.01); *B60G 2500/30* (2013.01); *F16F 2228/08* (2013.01)

(58) Field of Classification Search
CPC ........ B60G 2202/154; B60G 2202/413; B60G 2202/416; B60G 2202/31; B60G 2202/32; B60G 2202/312; B60G 2202/12; B60G 1/00; B60G 2204/124; B60G 230/12; B60G 2500/324; B60G 2500/30; B60G 15/062; B60G 2204/1242; F16F 1/121; F16F 9/38; F16F 9/56; F16F 13/007; F16F 2230/08; F16F 2228/08
USPC .......................... 267/221; 188/266.5, 282.12
See application file for complete search history.

(56) References Cited

U.S. PATENT DOCUMENTS

| | | | |
|---|---|---|---|
| 2014/0084528 A1* | 3/2014 | Murakami | B60G 17/0272 267/221 |
| 2015/0097323 A1* | 4/2015 | Awasa | B62K 25/286 267/218 |
| 2015/0314664 A1* | 11/2015 | Mochizuki | F16F 9/38 280/6.157 |

FOREIGN PATENT DOCUMENTS

| | | | |
|---|---|---|---|
| DE | 19849222 A1 | * | 5/2000 |
| DE | 10109555 | | 9/2002 |
| DE | 10353025 | | 6/2005 |
| DE | 102013222248 | | 4/2015 |
| EP | 2862734 A1 | * | 4/2015 |
| WO | WO-2011124513 | * | 10/2011 |
| WO | WO-2011124513 A1 | * | 11/2011 |

* cited by examiner

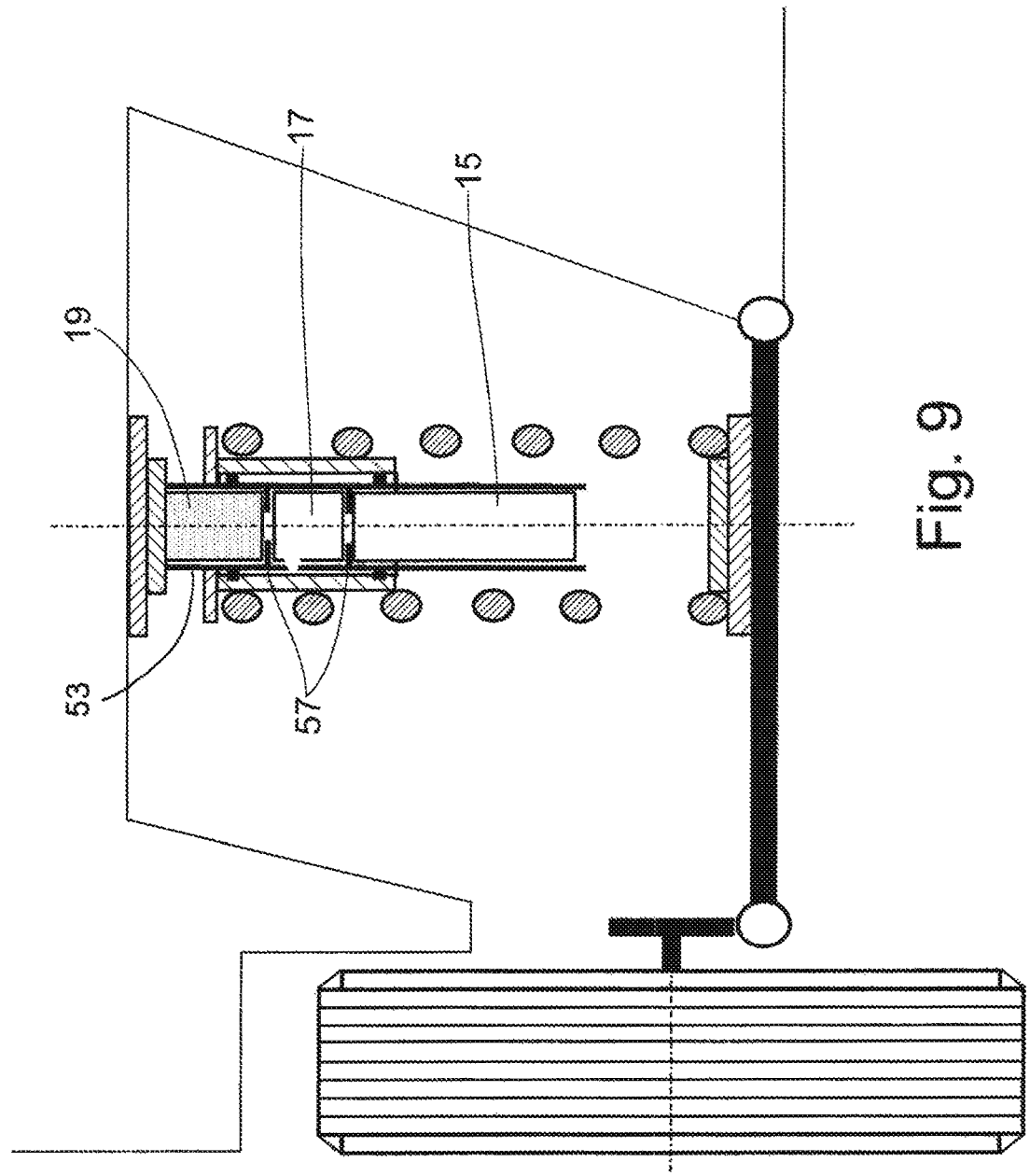

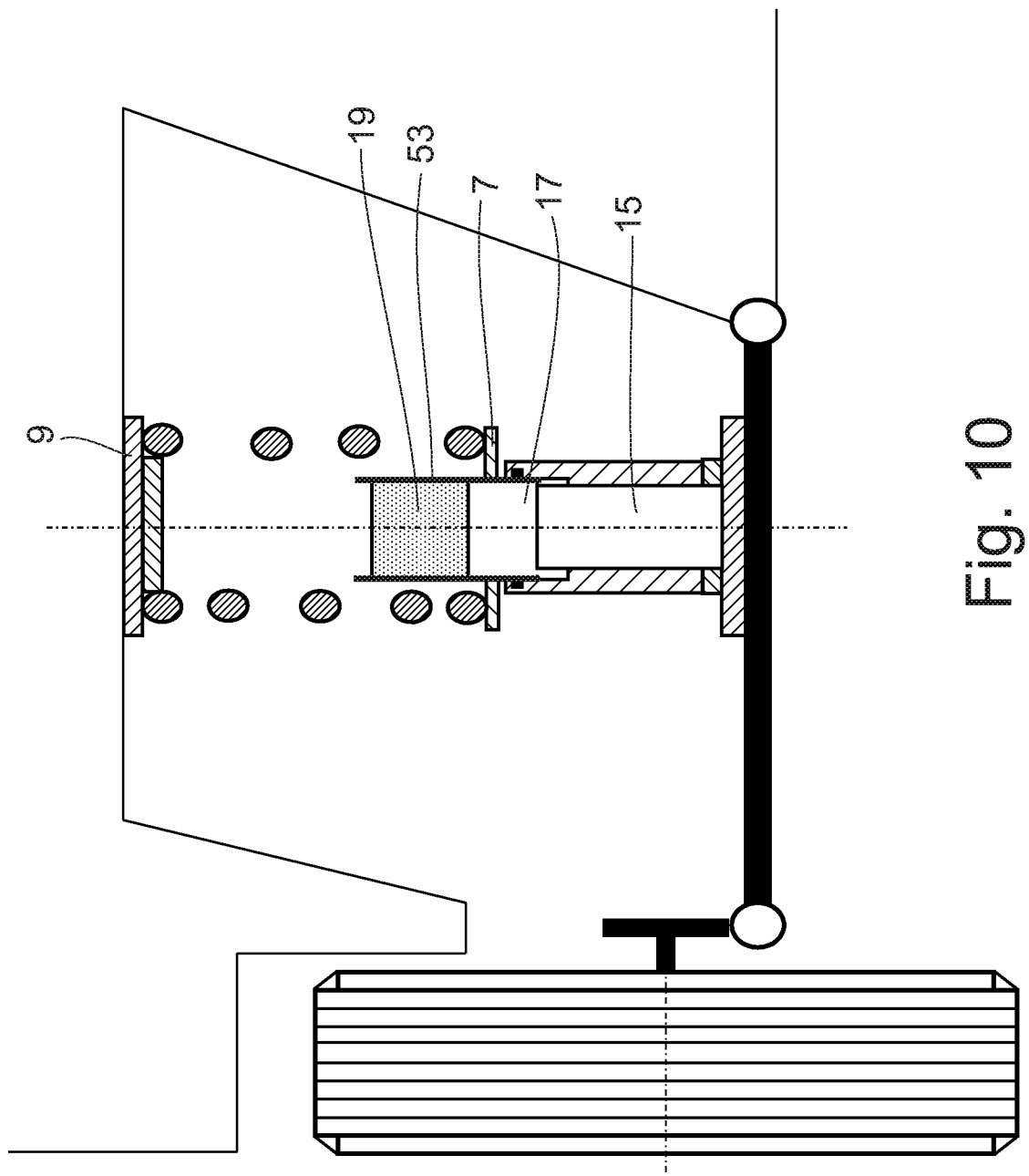

ADJUSTABLE SPRING SUPPORT

PRIORITY CLAIM

This is a U.S. national stage of application No. PCT/EP2016/057996, filed on Apr. 12, 2016. Priority is claimed on the following application: Country: Germany, No. 10 2015 208 785.9, filed: May 12, 2015, the content of which is/are incorporated in its entirety herein by reference.

FIELD OF THE INVENTION

The present invention is directed to an adjustable spring support with at least one adjustable spring plate.

BACKGROUND OF THE INVENTION

Known from DE 32 23 195 A1 is an adjustable spring support which comprises a first spring plate and a second spring plate, wherein the distance between the two spring plates can be varied by an actuator which can be actuated by pressure medium for specific preloading of a supporting spring arranged between the two spring plates in order to achieve a required carrying capacity.

A hydraulic medium is used as pressure medium. A pump conveys pressure medium from a supply receptacle to a cylinder of the actuator. A piston which is connected to one of the two spring plates is slidingly mounted in the cylinder.

As can be seen from the drawing, there is a conduit system between the pump, a supply receptacle and the actuator. This division of components has the advantage that the total system can be distributed in a vehicle and, in so doing, individual components such as the pump or the storage can also be positioned spatially distant from one another in a vehicle. However, this increases expenditure on conduits and assembly and heightens the risk of leaks.

Further, at least one flow valve is required for each vehicle wheel to enable adjustment of the required vehicle body level or preloading of the supporting spring via the spring support.

SUMMARY OF THE INVENTION

It is an object of the present invention to provide an adjustable spring support with a pressure medium system which can be assembled in a simple manner.

This object is met in that the motor, the pump and the supply receptacle form a single constructional unit. By arranging the entire pressure medium system as a single constructional unit, hoses and exposed output couplings can be dispensed with. Further, the overall assembly is simplified. For example, if a plurality of spring supports are used in a chassis, then one flow supply connection and one CAN-bus connection are sufficient to achieve the required function.

A particularly compact construction can be achieved in that the constructional unit provides a cylindrical surface of the actuator.

In a further advantageous configuration, at least two of the components including motor, pump and supply receptacle are arranged axially in series. This results in a compact construction and short power line connections between the components.

A particularly advantageous solution is distinguished in that the supply receptacle at least partially encloses the motor. The hydraulic medium can then assume a cooling function for the motor.

Further, it is possible that the supply receptacle at least partially encloses a driveshaft of the motor for the pump. This variant is suitable when aiming for a constructional unit having two "dry" end components, e.g., in order to obtain lighter cable connections for the power supply or sensor arrangement.

An especially compact supply receptacle is achieved when the actuator is constructed as a synchronous cylinder and the supply receptacle is formed by a first cylindrical space and a second cylindrical space. The supply receptacle for the pressure medium volume can be dispensed with in practice because the synchronous cylinder makes up the supply receptacle. Consequently, a very short constructional unit is achieved.

It can also be provided that the constructional unit has an enveloping pipe which provides the cylindrical surface for the actuator. The substantial advantage consists in that there is then considerably more leeway for configuring the outer contour of the actuator, e.g., to provide cooling ribs or stiffening ribs.

Optionally, the enveloping pipe can extend at least over at least two components of the constructional unit which are arranged in series. The enveloping pipe is only arranged, e.g., in the region of the spring support which also receives the actuator.

In a further advantageous configuration, the enveloping pipe can have at least one intermediate base, e.g., in order to fasten a component of the constructional unit. The enveloping pipe then forms a support cartridge for the constructional unit in practice.

In a constructional variant, it is provided that the constructional unit is axially displaceably mounted in the enveloping pipe, and a spring plate is fixed to the constructional unit. The enveloping pipe then functionally forms the cylinder, and the constructional unit forms the piston of the actuator.

According to an advantageous embodiment, the constructional unit is fastened to a component part which is to be supported, e.g., the vehicle body or a vehicle cab. In this arrangement, the power supply and the connection to the sensor arrangement for controlling the spring support are particularly simple. Further, the constructional unit does not influence the unsprung mass of a vehicle in this case.

Alternatively, it can also be useful when the constructional unit is fastened to a supporting component part, e.g., the vehicle axle or a vehicle frame. In this case, no vibrations emanating from the motor or pump are transmitted to the vehicle body or vehicle cab.

In principle, it is also possible that the cylindrical surface of the constructional unit has a radial step which forms a cylindrical base of the actuator. The overall construction of the actuator is simplified in this way.

BRIEF DESCRIPTION OF THE DRAWINGS

The invention will be described more fully below with reference to the figures in which:

The drawings show:

FIGS. 8-10 shows a spring support with an enclosing sleeve.

DETAILED DESCRIPTION OF THE PRESENTLY PREFERRED EMBODIMENTS

Figure 1:
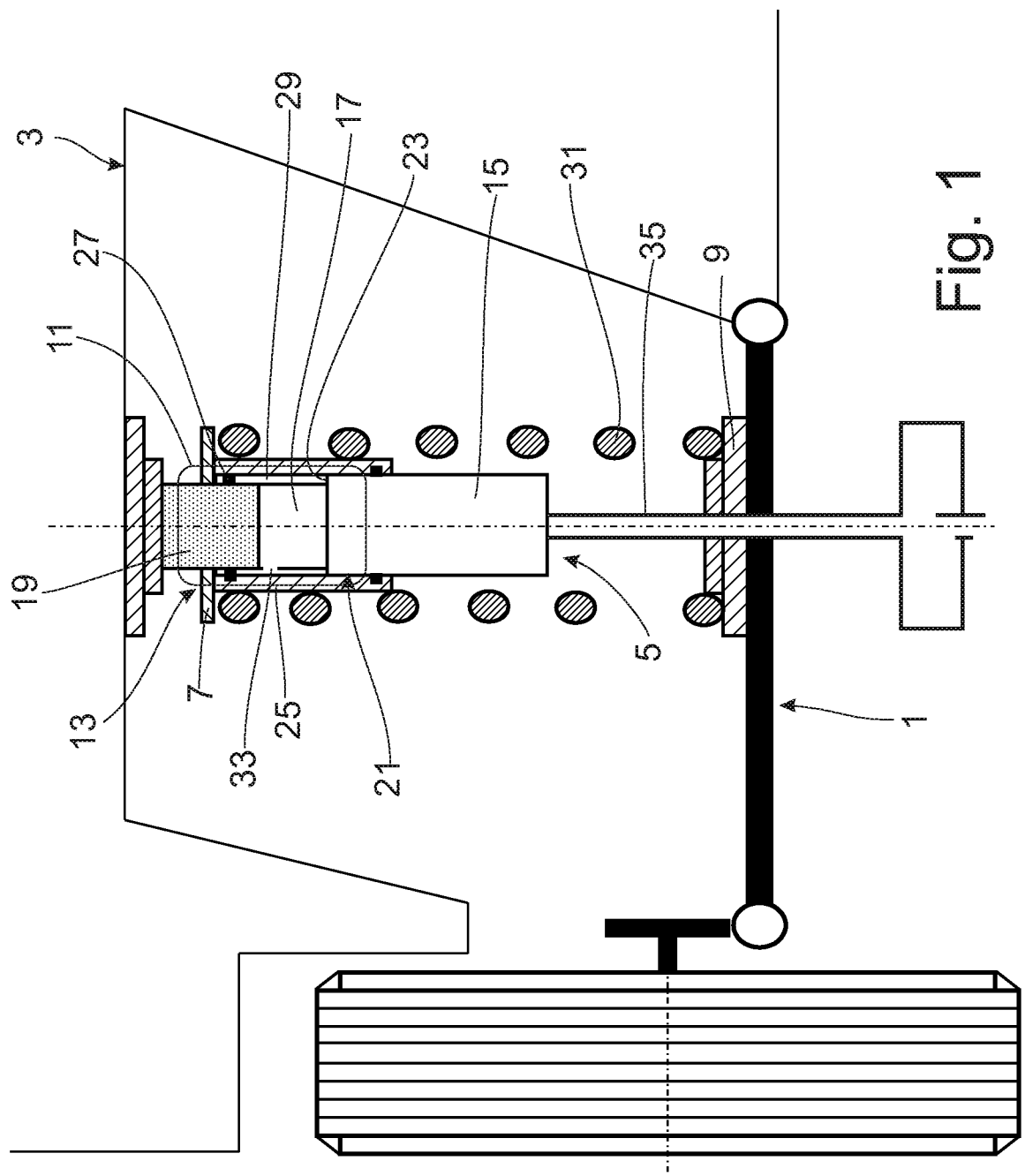
FIG. 1 shows a spring support with mechanical connection via the supply receptacle.

FIG. 1 shows a section from a vehicle in the region of a vehicle half-axle which is only shown schematically. The application of the invention is not limited in principle to this axle construction. For reasons of simplicity, the description of a vibration damper of a selected construction which is generally employed will be omitted.

An adjustable spring support 5 is arranged between a supporting component part 1, i.e., the vehicle axle in this embodiment example, and a component part 3 to be supported, which is shown as a vehicle body. The adjustable spring support 5 comprises a first spring plate 7, a second spring plate 9 and a pressure medium system 11 with an actuator 13 for one of the two spring plates. Spring plate 9 is supported at the vehicle axle 1 and the other spring plate 7 is supported via actuator 13 at the vehicle body 3.

In the simplest configuration, the pressure medium system 11 comprises a motor 15 for driving a pump 17 and a supply receptacle 19 for the pressure medium with which the actuator 13 is filled by the pump 17.

In this embodiment, the three main components, motor 15, pump 17 and supply receptacle 19, are arranged axially in series and form a single contiguous constructional unit in which components directly contact one another so that there are no gap-bridging hose connections or pipe connections. There is a rigid connection of the partial housings of the three components so that transverse forces acting on the constructional unit 15; 17; 19 could also be absorbed. Further, the motor 15 is constructed so as to be hydraulically sealed with respect to the supply receptacle 19 and the pump 17.

The outer lateral surface of the constructional unit 15; 17; 19 forms a cylindrical surface 21 of the actuator 13. Further, it can be seen that the cylindrical surface 21 of the constructional unit 15; 17; 19 has a radial step 23 which forms a stationary cylinder base of the actuator 13 against which the operating pressure in the actuator can be supported. An actuator cylinder 25 with a base 27 slides on the cylindrical surface 21 in a sealed manner so that a closed pressure medium chamber 29 is provided. The spring plate 7 is fastened to the actuator cylinder 25. A support spring 31 is preloaded between two spring plates 7; 9, the preloading of the support spring 31 being adjustable by varying the axial distance between the two spring plates 7; 9 in order to adapt the supporting force to a target force.

In this example, the constructional unit 15; 17; 19 is mechanically fixed via the supply receptacle 19 to the component part 3 to be supported. A power supply 35 and the connection to a sensor arrangement, not shown, at the vehicle are carried out via the open end of the motor 15 via the vehicle axle 1. "Via the vehicle axle" means along and/or through the axle.

For example, when the vehicle is to be raised, for example, in order to increase ground clearance, pressure medium is conveyed back into the supply receptacle 19 from the pressure medium chamber 29 against the force of the support spring 31 via the pump 17 which is driven by the motor 15. A connection opening 33 is shown schematically between the pump 17 and the pressure medium chamber 29.

Figure 2:
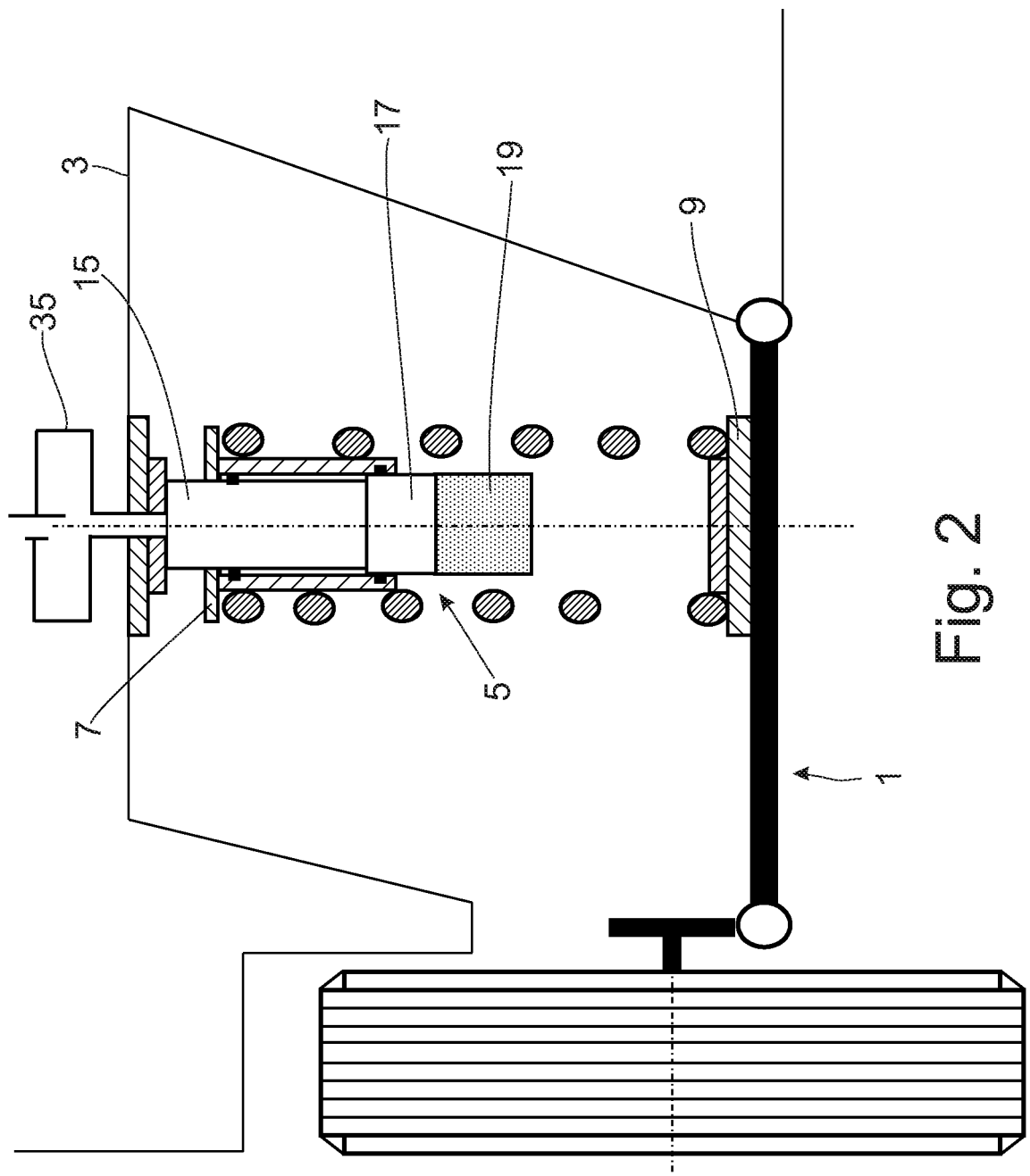
FIG. 2 shows a spring support via the motor fastened to the component part to be supported.

FIG. 2 shows a constructional unit 15; 17; 19 having the same series arrangement of individual components as FIG. 1. The difference is that the constructional unit 15; 17; 19 is fastened via the motor 15 to the component part 3 to be supported. Another difference is that the power supply 35 is carried out via the component part to be supported. In this power supply, the connection lines are particularly well-protected against external influences.

Figure 3:
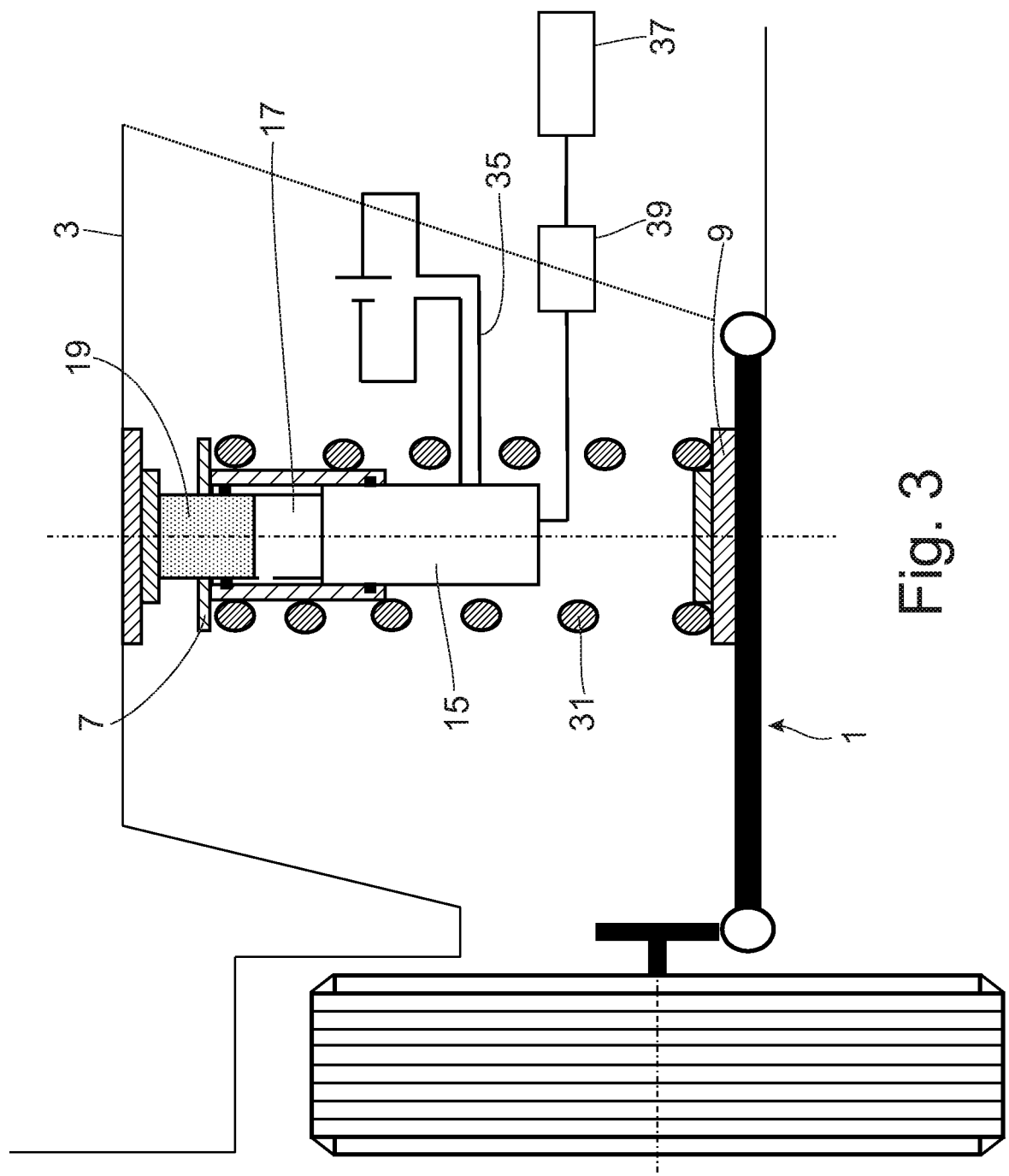
FIG. 3 shows a variant of FIG. 1 with radial connected power supply.

It will be clear from FIG. 3 that it is also possible to arrange the connection lines for the power supply 35, a sensor arrangement 37 and a control device 39 radially through the support spring 31. Typically, a support spring 31 is designed so as not to be loaded to the point of solid length. For this purpose, stop buffers are possibly used within the vehicle axle 1 and are functionally connected in parallel with the spring support 5.

The connection lines are not shown in the further figures.

Figure 4:
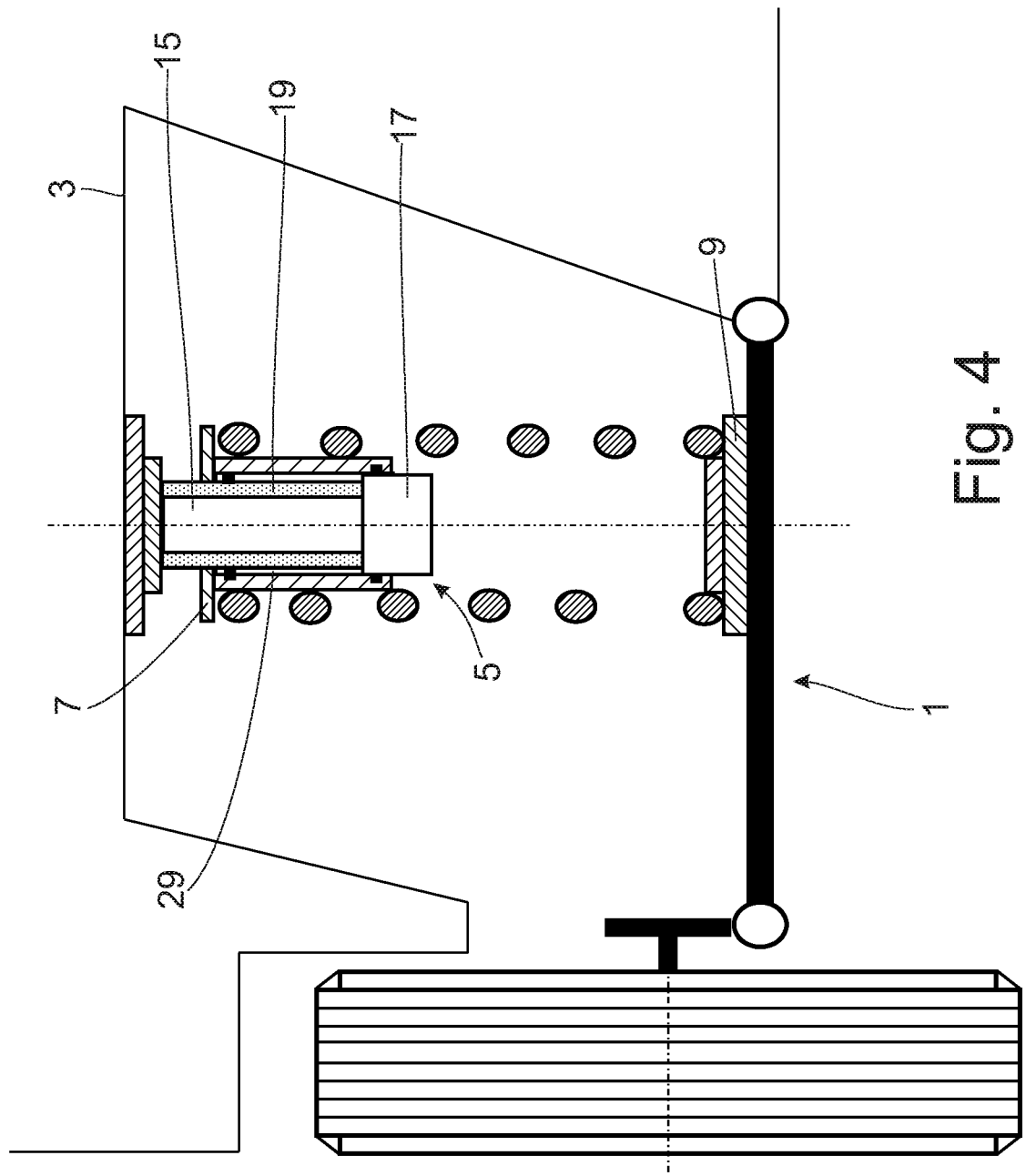
FIG. 4 shows a variant with annular supply receptacle.

FIG. 4 shows a further variant of the constructional unit 15; 17; 19 in which the two components 15; 19 are arranged together in series with the third component 17. In this case, the supply receptacle 19 is constructed as annular cylinder at least partially surrounding the motor 15. Operation is similar to that described referring to FIG. 1, according to which pressure medium is recirculated as needed between the pressure medium chamber 29 and the supply receptacle 19 via pump 17.

Figure 5:
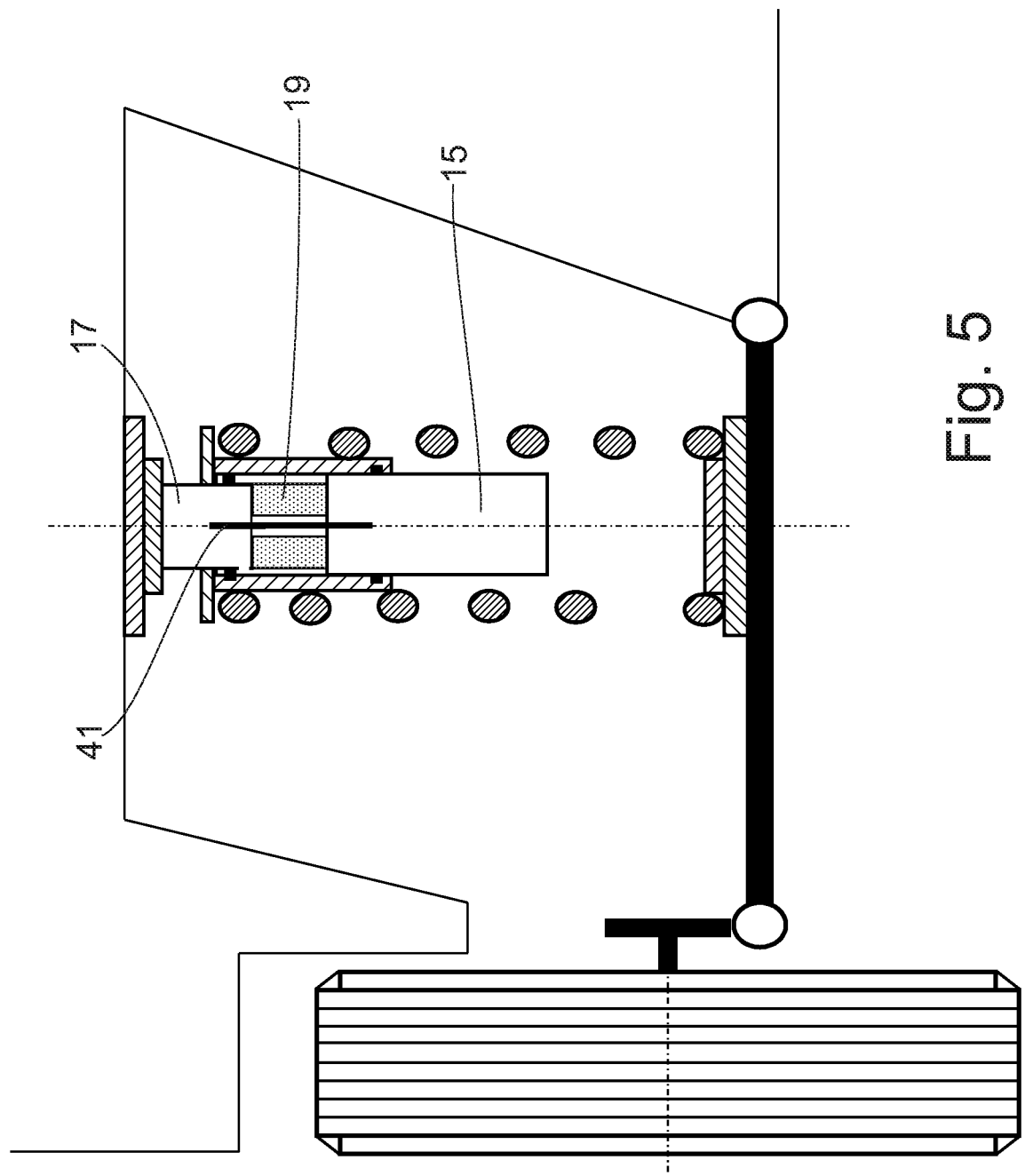
FIG. 5 shows a further series arrangement of the components of the spring support.

It will be clear from FIG. 5 that it is also possible to implement a series arrangement of the components comprising pump 17, supply receptacle 19, motor 15. To this end, the supply receptacle 19 is formed as an annular chamber which at least partially surrounds a driveshaft 41 of the motor 15 for pump 17.

Figure 6:
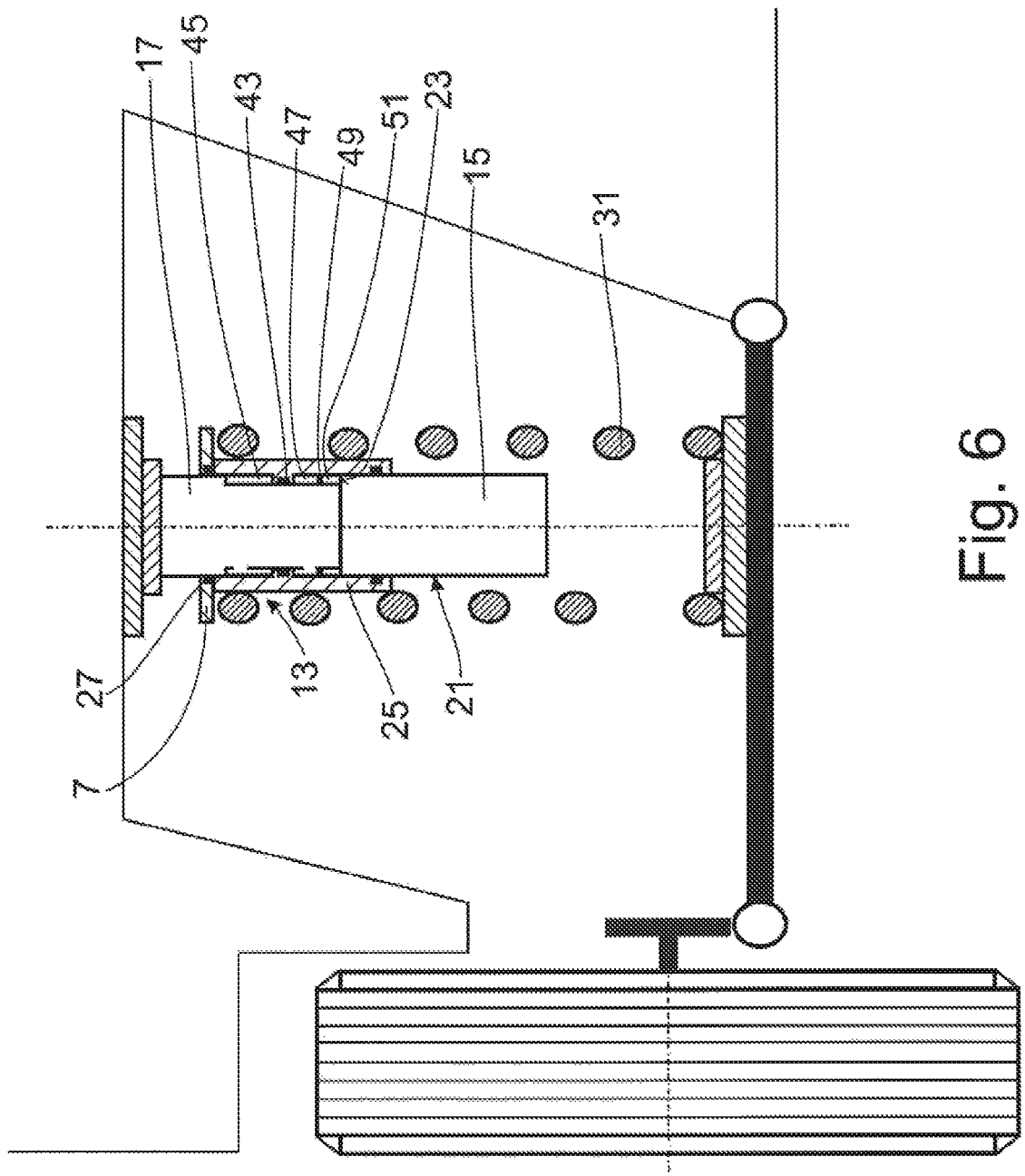
FIG. 6 shows a spring support with pressure medium chamber as supply receptacle.

In FIG. 6, the actuator 13 is constructed as a synchronous cylinder. The actuator cylinder 25 has an intermediate base 43 which divides the pressure medium chamber in two. The pump 17 pumps pressure medium between a first pressure medium partial chamber 45 and a second pressure medium partial chamber 47. In this configuration, it is possible to carry out a spring plate adjustment actively against the force of the support spring 31. As a general rule, this working principle is possible. To this end, the displaceable base 27 of the actuator cylinder 25 need simply be arranged at the end of the pressure medium partial chamber 47 opposite spring plate 7 or, in other words, the step 23 in the cylindrical surface 21 must face in direction of the nonadjustable spring plate 9.

Optionally, it can be provided that a dividing piston 49 which cooperates with a gas storage 51 is arranged in one of the pressure medium partial chambers 45; 47. Even thermal volume changes in the pressure medium system can be compensated with this construction principle. The two pressure medium partial chambers 45; 47 form the supply receptacle 19.

Figure 7:
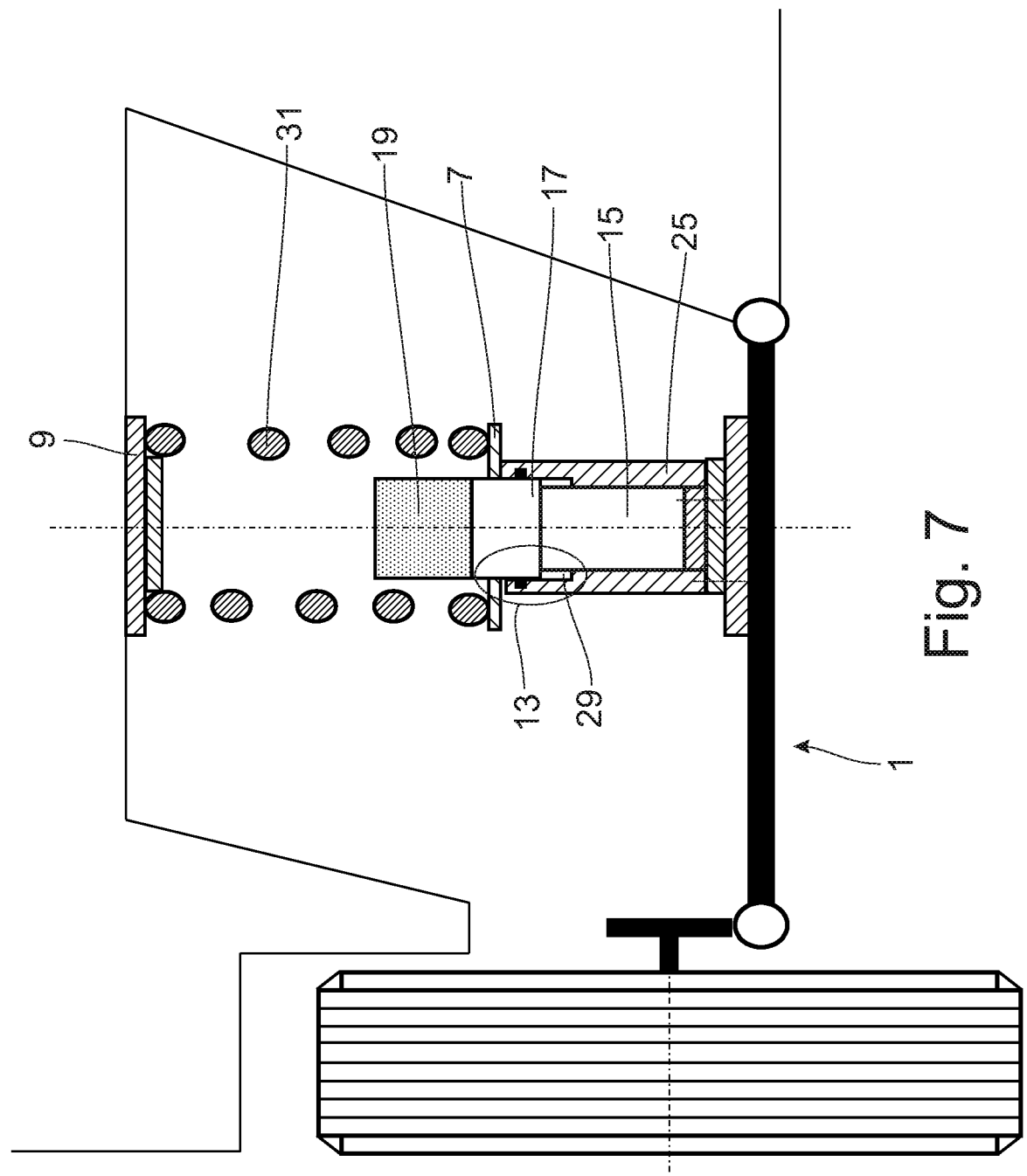
FIG. 7 shows a spring support at the vehicle axles.

In FIG. 7, the actuator cylinder 25 in the left-hand half-section is fixed to the supporting component part 1, and the constructional unit 15, 17, 19 is guided in a floating manner in the actuator cylinder 25 against the volume of the pressure medium chamber 29. The adjustable spring plate 7 is connected in an axially fixed manner to the constructional unit 15; 17; 19. In this case also, the adjusting force of the actuator 13 acts against the support spring 31.

The right-hand half-section shows that the constructional unit 15; 17; 19 can also be fixed via the motor 15 at the supporting component part 1, and the adjustable spring plate 7 is fastened to the actuator cylinder 25 as in FIGS. 1-6. A spring plate adjustment is then carried out against the force of the support spring 31 by pumping pressure medium out of the pressure medium chamber 29 into the supply receptacle 19.

Figure 8:
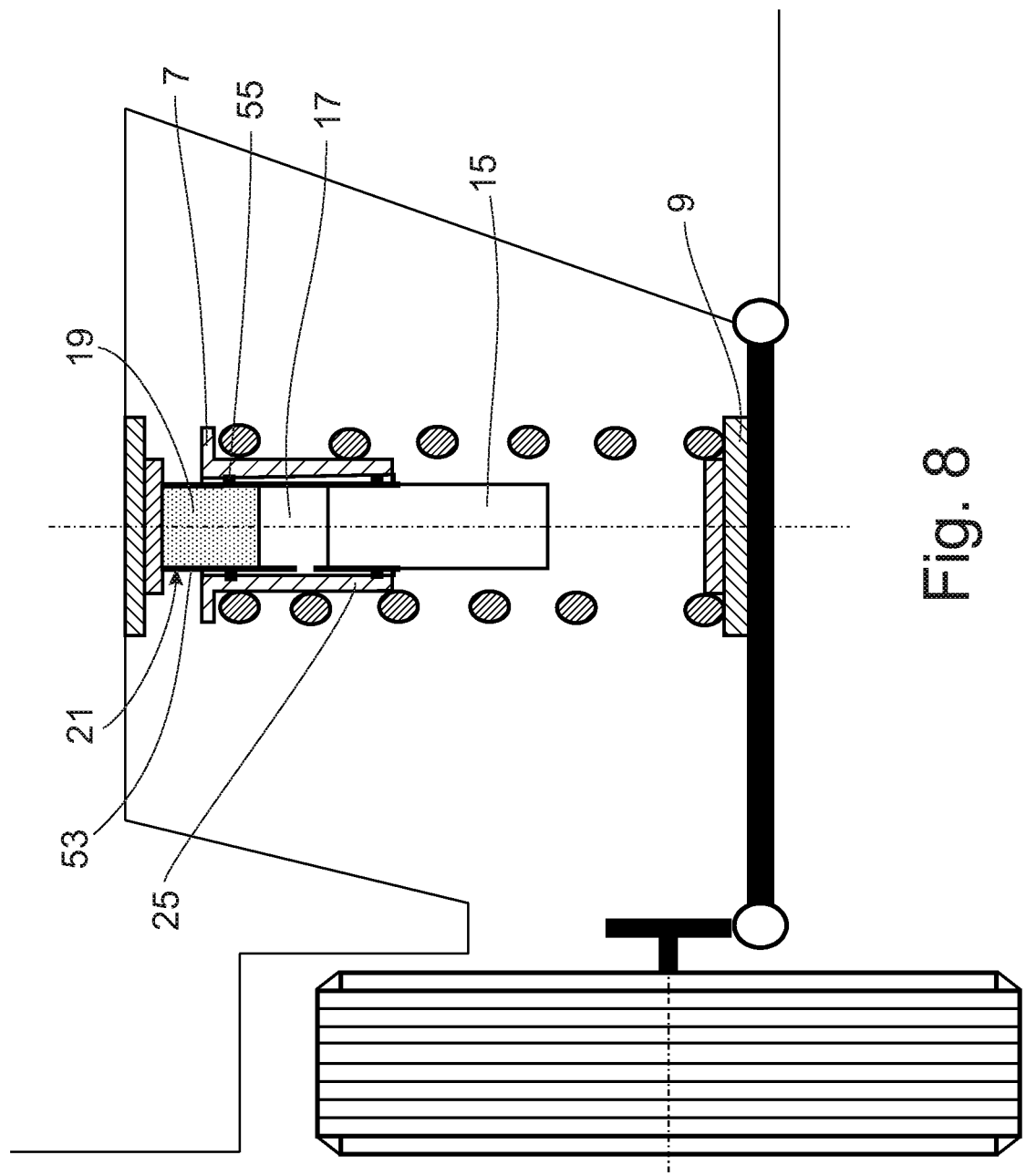

FIG. 8 shows a variant in which the constructional unit 15; 17; 19 has an enveloping pipe 53 which provides the cylindrical surface 21. A pressure medium chamber base 55 is formed at the cylindrical surface 21 instead of the step shown in FIG. 1. The pressure medium chamber base can be formed as a separate component part or can also be formed directly from the enveloping pipe 53. In FIG. 8, the enveloping pipe 53 extends at least partially over all three of the components 15; 17; 19 of the constructional unit. However, the enveloping pipe 53 can also be limited to the constructional length of the pressure medium chamber 29, including the displacement of the actuator cylinder 25.

FIG. 9 discloses a variant with a basic construction comparable to FIG. 8. In addition, the enveloping pipe 53 has at least one intermediate base 57 to which the adjacent components 15; 17; 19 can be axially fixed.

It will be clear from FIG. 10 that the basic principle according to FIG. 7 can also be used in connection with an enveloping pipe 53. In this case, the enveloping pipe 53 is connected axially fixedly to the supply receptacle 19 and/or pump 17 and carries the adjustable spring plate 7.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An adjustable spring support comprising:
a first spring plate and a second spring plate;
an actuator for axially adjusting at least one of the first and second spring plate relative to the other one of the spring plates;
a supply receptacle for holding a pressure medium;
a motor operatively connected to the supply receptacle;
a pump driven by the motor for supplying the pressure medium to the actuator;
wherein the motor, the pump and the supply receptacle form a single constructional unit;
wherein the actuator is constructed as an axially movable synchronous cylinder comprising an intermediate base separating a first cylinder space from a second cylinder space; and the supply receptacle is formed by the first cylindrical space and the second cylindrical space.

2. The adjustable spring support according to claim 1, wherein the constructional unit provides a cylindrical surface of the actuator.

3. The adjustable spring support according to claim 1, wherein at least two of the components including the motor, the pump and the supply receptacle are arranged axially in series.

4. The adjustable spring support according to claim 2, wherein the supply receptacle at least partially encloses the motor.

5. The adjustable spring support according to claim 2, wherein the motor comprises a drive shaft and the supply receptacle at least partially encloses the driveshaft.

6. The adjustable spring support according to claim 1, wherein the constructional unit is fastened to a component part which is to be supported.

7. The adjustable spring support according to claim 1, wherein the constructional unit is fastened to a supporting component part.

8. The adjustable spring support according to claim 1, wherein the constructional unit comprises a cylindrical surface including a radial step which forms a cylindrical base of the actuator.

* * * * *